United States Patent [19]

Abe et al.

[11] 4,416,800
[45] * Nov. 22, 1983

[54] METHOD FOR PRODUCING A CATALYST AND A CARRIER THEREFOR INCLUDING HEAT-RESISTANT FIBERS

[75] Inventors: Kazunobu Abe, Izumi; Tadao Nakatsuji, Matsubara, both of Japan

[73] Assignee: Sakai Chemical Industry Co., Ltd., Japan

[*] Notice: The portion of the term of this patent subsequent to Jul. 28, 1998 has been disclaimed.

[21] Appl. No.: 245,687

[22] Filed: Mar. 19, 1981

Related U.S. Application Data

[62] Division of Ser. No. 72,599, Sep. 5, 1979, Pat. No. 4,280,926.

[30] Foreign Application Priority Data

Sep. 12, 1978 [JP] Japan ................... 53-112558
Jan. 9, 1979 [JP] Japan ..................... 54-1694
Apr. 27, 1979 [JP] Japan ................... 54-53186

[51] Int. Cl.³ .................. B01J 35/04; B01J 31/28; B01J 21/14; B01J 21/12
[52] U.S. Cl. ........................ 502/159; 156/89; 502/182; 502/184; 502/185; 502/527; 502/243; 502/242; 502/251; 502/254; 502/258; 502/263

[58] Field of Search .......... 252/430, 428, 447, 455 R, 252/457, 458, 459, 461, 477 R; 156/89, 292; 423/213.2, 239 A, 239 R; 428/116; 264/122; 422/180

[56] References Cited

U.S. PATENT DOCUMENTS

| | | | |
|---|---|---|---|
| 3,554,929 | 1/1971 | Aarons | 252/4 R |
| 3,799,796 | 3/1974 | Hunter | 252/477 R |
| 3,912,658 | 10/1975 | Kaneko et al. | 252/455 R |
| 3,982,981 | 9/1976 | Takao | 156/89 |
| 4,140,654 | 2/1979 | Yoshioka et al. | 252/455 R |
| 4,176,091 | 11/1979 | Inaba et al. | 423/239 |
| 4,280,926 | 7/1981 | Abe et al. | 252/430 |

*Primary Examiner*—P. E. Konopka
*Attorney, Agent, or Firm*—Wenderoth, Lind & Ponack

[57] ABSTRACT

A method is provided for producing a catalyst and a carrier therefor in the form of sheet or honeycomb. The method comprises: beating a heat-resistant fiber such as asbesto fiber in water to form a slurry; mixing the slurry with a catalytically active agent, a carrier material therefor and/or their precursors to fix such materials in the fiber, thus forming a stock; and forming the stock into a sheet and drying the same. The sheet thus obtained may be formed into a honeycomb structure with an improved adhesive.

19 Claims, 6 Drawing Figures

METHOD FOR PRODUCING A CATALYST AND A CARRIER THEREFOR INCLUDING HEAT-RESISTANT FIBERS

This is a divisional of Ser. No. 72,599 filed Sept. 5, 1979, now U.S. Pat. No. 4,280,926.

The present invention relates to a method for producing a catalyst and a carrier therefor in the form of sheet or honeycomb.

A honeycomb catalyst has passages therethrough parallel to the direction of flow of gas to be treated, and thus it is advantageously used for treating a large amount of gas of a large linear velocity, as is the case of catalytic reduction of nitrogen oxides contained in an exhaust gas such as from a boiler, an internal combustion engine and a nitric acid plant, since the gas under treatment is not subjected to a large pressure drop during passage through the catalyst. A further advantage of the honeycomb catalyst is that a suitable choice of diameter of the passages thereof permits dusts in the gas to pass therethrough without depositing in the catalyst.

The honeycomb catalyst has been heretofore produced by several methods. In a method now most widely employed, a slurry of ceramic material such as cordierite, mullite and clay is extruded from a die directly into a honeycomb structure, which is then dried and coated with a catalyst forming material, as the term "catalyst forming material" herein the specification means a catalytically active agent, a carrier substance therefor and/or their precursors which will be converted into the active form when calcined. According to this method, however, since such ceramic materials as a substrate are in general inactive or inert as well as poor in water-absorbency, the substrate should be repeatedly immersed in a slurry or a solution containing the catalyst forming material so as to have a sufficient amount of the catalyst forming material supported thereon. Usually, the substrate should have a coating of the catalyst forming material of about 200–300 microns thick. As is apparent, the repeated immersion process results in a higher production cost. On the other hand, since the ceramic substrate generally has a weak affinity for such a coating formed thereon, the coating is liable to separate from the surface of the substrate.

Alternately, the ceramic honeycomb catalyst is produced by extruding a slurry of the catalyst forming material themselves to obviate the above disadvantage. This method provides a honeycomb catalyst having the catalytic forming material integrally incorporated therein. However, the method requires a larger amount of expensive catalyst forming material. In common with both the methods above, there is a further disadvantage in that it is difficult to handle due to its heavy-weight.

Thus, a honeycomb catalyst much lighter and easier to handle than the ceramic honeycomb catalyst has been proposed. For example, Japanese Patent Disclosure No. 53-1978 discloses a honeycomb catalyst which comprises flat sheets and corrugated sheets both of asbestos piled up together alternately to form a multiply corrugated board as a honeycomb structure having the catalyst forming material carried or coated thereon. However, this catalyst has a very low catalytic activity since asbestos is lacking in so-called carrier effect, i.e., the action of the carrier of enhancing the catalytic activity, as in the case of the ceramic substrate, and also since an adhesive such as water glass and aluminum phosphates heretofore used for binding the sheets into a honeycomb structure has a poisoning or deactivating effect upon the active agent and/or the carrier therefor. Also as in the case of the ceramic substrate, the asbestos sheets should be repeatedly immersed in or coated with the catalyst forming material so as to have a sufficient amount of the material carried therein, and the resultant thick coating is liable to have cracks thereon when dried or calcined. When a dense slurry or solution of the catalyst forming material is used, it is difficult to obtain a catalyst having the catalyst forming material uniformly carried or coated therein due to the non-uniform distribution of the material caused during the drying or calcination.

It is, therefore, a general object of the present invention to obviate the disadvantages as above and to provide an improved catalyst and a carrier therefor.

In particular, it is an important object of the present invention to provide a method for producing a catalyst in the form of a sheet having the catalyst forming material uniformly dispersed therein and integrally fixed therein.

It is also an object of the invention to provide a catalyst of a high activity with a thin coating of the catalyst forming material of about 50–100 microns thick, or with a small amount of the catalyst forming material impregnated with the substrate, thereby forming a catalyst of a high performance at low cost.

It is still another object of the present invention to provide a catalyst and a carrier therefor in the form of honeycomb in which an improved adhesive is used for manufacturing thereof.

Other objects and features of the present invention will be apparent from the following description with reference to the drawings attached hereto, in which.

According to the present invention, there is provided a method for producing a catalyst and a carrier therefor which comprises: beating a heat-resistant fiber in water to form a slurry, thoroughly mixing the slurry with at least one catalyst forming material selected from the group consisting of a catalytically active agent, a carrier material therefor and their precursors to form a stock, forming the stock into a sheet, and drying the sheet. The sheet may then be formed into a honeycomb structure.

The heat-resistant fiber used in the present invention is either an inorganic fiber or an organic fiber which is capable of beating and stable preferably at least at a temperature of about 200° C., and preferably has a diameter of about 0.1–30 microns and a length of about 1–20 mm. Inorganic fibers preferably used in the invention are, for example, asbestos fiber, silica fiber, silica-alumina fiber, ceramic fiber, glass fiber, rock wool, chrysotile fiber, anthophyllite fiber, potassium titanate fiber and carbon fiber. The asbestos fiber is preferably used in the invention since the fiber has an excellent formability into a sheet and into a honeycomb structure. A preferred example of the organic fibers used in the invention is polytetrafluoroethylene fiber. A mixture of the above fibers may be used, if desired.

As is apparent, the fiber used depends upon the conditions, in particular, the temperature, under which the catalyst manufactured therefrom is used. For example, the asbestos fiber is suitably selected when the catalyst therefrom is used at temperatures below about 500° C. In turn, when the desired reaction is carried out at or lower than about 1000° C., the ceramic fiber is preferably selected.

The heat-resistant fiber is beaten in water to a sufficient degree to permit the fiber to form a sheet thereof with the catalyst forming material by a conventional paper making machine or a hand mould. A sheet of the heat-resistant fiber and a method for producing the same are known, and herein the invention it is enough that the fiber is beaten to such a degree as to permit the fiber to form such a known sheet by a conventional process. The catalyst forming material is added to the slurry of the fiber either on or after the beating thereof, if desired, together with other additives, which will be later described. The resultant slurry is thoroughly mixed to provide a stock also in the form of slurry, and the stock is formed into a sheet by a conventional method. As will be readily understood, the stock containing an active agent or its precursor as well as a carrier material therefor provides a catalyst in the form of sheet. On the other hand, the stock containing only a carrier material or its precursor provides a carrier in the form of sheet. The sheet thus obtained is thereafter coated or impregnated with an active agent or its precursor, and when needed, dried or calcined, thus to provide a catalyst in the form of sheet.

According to the present invention, the stock contains about 95-20 parts by weight, preferably about 80-40 parts by weight, of the heat-resistant fiber and about 5-80 parts by weight, preferably about 20-60 parts by weight, of the catalyst forming material. The catalyst forming material has a particle size of about 0.01-50 microns, preferably about 0.1-10 microns. When containing more than about 95 parts by weight of the fiber and less than about 5 parts by weight of the catalyst forming material, the stock will not provide a sheet having a sufficiently high catalytic activity and/or carrier effect. On the other hand, when containing less than about 20 parts by weight of the fiber and more than about 80 parts by weight of the catalyst forming material, the stock will be difficult to form into a sheet, and if obtained, the sheet will not have a sufficiently large strength for further processing and for practical use.

As will be readily understood, the carrier materials used depend upon the active agent used in the desired reaction. Some examples of frequently used carrier materials are titania, alumina, silica, silica-alumina, magnesia, zirconia and thoria. The carrier material of powder is preferably used, and is added to the slurry of the fiber in the form of powder as is or slurry. Instead of active form of carrier material, their precursors may be used which will be converted into the active form when dried and calcined. For example, titanium hydroxide, aluminum hydroxide and magnesium hydroxide are the precursors of titania, alumina and magnesia, respectively.

The active agent incorporated into the sheet with the fiber, as is apparent, depends upon the reaction for which it is intended. For example, when the catalytic reduction of nitrogen oxides in a waste gas in the presence of a reducing agent such as ammonia is aimed, the active agents used are, for example, cupric oxide, ferric oxide, vanadium pentoxide, tungsten trioxide, molybdenum trioxide, and their mixtures, as is known in the art. A precursor which will be converted into the oxides as above when calcined may be used instead of the active agents as above. For example, ferric hydroxide and ammonium metavanadate are the precursors of ferric oxide and vanadium pentoxide, respectively.

As is stated hereinbefore, the stock preferably contains a binder in an amount of about 0.5-10% by weight based on the catalyst forming material in the stock. The binders suitably used in the invention are inorganic binders such as alumina sol, silica sol and titania sol, and organic binders, in particular, synthetic rubbers such as acrylonitrile-butadiene rubber (NBR) and styrene-butadiene rubber (SBR). The stock may further contain a fixing agent and/or a sizing agent. The fixing agent preferably used in the invention are organic cationic polyelectrolytes such as polyacrylamine, polyamine, polyamine- and polyamide-epichlorohydrin condensation polymer and polyethyleneimine. The polyamine includes condensates of alkylene dichlorides with alkylenepolyamines such as ethylenediamine, tetramethylenediamine and hexamethylenediamine, poly(N,N-dimethyl- and diethylaminomethacrylate), polyvinylimidazoline, polyvinylpyridine, cycloaddition polymers of diallylamine, copolymers of N-vinylpyrolidone and acrylamide, and their quaternary salts such as halides and ammoniums. Inorganic fixing agents such as aluminum sulfate and ferric sulfate are also preferably used in the invention. The amount of the fixing agents in the stock is preferably in the range of about 2-10% by weight based on the catalyst forming material therein. The stock may contain a sizing agent in an amount of 0.01-1% by weight based on the solid components, i.e., the fiber and the catalyst forming material in the stock. Rosins and organosilicone polymer, for example, polysiloxanes, are used as the sizing agent. The fixing agent and the sizing agent are added usually in the form of aqueous emulsion or solution to the slurry of the fiber and the catalyst forming material.

In more detail, however, for an example only, the stock is prepared as follows. The fiber is beaten in water to form an aqueous slurry, and is added thereto and thoroughly mixed therewith the catalyst forming material. Then, when desired, the fixing agent and/or the sizing agent are added to the slurry, followed by the addition of a mineral acid such as sulfuric acid to arrange pH of the resultant mixture to about 3-6, preferably about 4-5. On the other hand, when the fixing agent is not used in the stock preparation, the stock may have pH preferably of about 6-8. Finally, when needed, the binder is added to the slurry, thereby providing a stock. The solid concentration of the stock is then arranged so as to be about 1-10% by weight, preferably about 2-6% by weight for paper making process.

The stock thus obtained is formed into a dried sheet by a conventional paper making machine as usual such as the cylinder machine, the Fourdrinier machine and the short wire machine. The stock may be hand-made into a sheet by a hand mound, when needed. The sheet is dried usually at temperatures of about 60°–150° C. When a fiber of a high melting point is used, however, the sheet may be dried at higher temperatures.

According to the invention, the sheet thus obtained may be further coated or impregnated with the catalyst forming material so as to support the material on or in the sheet in a larger amount before or after the sheet is formed into a honeycomb structure. More particularly, the sheet or the honeycomb manufactured therefrom is immersed in a slurry or a solution containing about 50–500 g/l of the catalyst forming material, the excess amount of the slurry or solution removed from the substrate, dried, and if necessary, calcined to convert the precursor into the active form. When desired, the above process is repeated. The sheet, after coating or immersing, is dried preferably with air passed thereon or therethrough so that the material coated or impregnated has a uniform distribution over the sheet. The electromagnetic drying is also preferably employed. The drying temperature is usually about 80°–200° C., but may be higher than the temperature, depending on the fiber and the additives.

The slurry or the solution for coating or immersing the sheet and the honeycomb may contain about 1–10 parts by weight of the same fiber as used for forming the sheet, such as asbestos fiber, glass fiber, ceramic fiber, silica fiber, ammosite fiber and their mixtures, or about 0.5–5 parts by weight of an organic fiber such as polytetrafluoroethylene fiber, polyamide fiber, wood pulp fiber and their mixtures, in relation to 100 parts by weight of the catalyst forming material in the slurry or the solution. If desired, the slurry or the solution may contain about 1–10 parts by weight of both the inorganic and organic fibers in relation to 100 parts by weight of the catalyst forming material therein. The fiber improves the mechanical strength of the coating such as adhesive strength and scratch resistance, but also prevents the generation of cracks thereon otherwise often appear on the coating when dried. The fiber used for the above purpose preferably has a length of about 0.5–5 mm in length and a diameter of about 0.1–30 microns.

The sheet of the invention may be processed into a honeycomb structure for practical uses. In the present invention, a honeycomb structure and a method for manufacturing the same are not in particular limited, but include those which have been heretofore known in the art. Therefore, for illustrating the invention only, there are shown some examples of honeycomb structure in the drawings attached hereto. First referring to FIG. 1, there is shown the flat sheet 11 of the invention as a linerboard which has a corrugated sheet 12 as a corrugating medium manufactured from the flat sheet of the invention glued thereto at the tops 13 of the corrugations, thus providing a structure known as a single-faced corrugated board. Although not shown, the corrugated sheet is glued on the both sides thereof to the flat sheets to provide a structure known as a double-faced corrugated board. The corrugated boards are then piled up together with glued to each other to form a honeycomb structure known as a multiply corrugated structure as is shown in FIG. 2. The thus obtained honeycomb is usually held in a basket and is charged in a reactor so that the passages 14 formed between the flat sheets 11 and the corrugated sheets 12 are parallel to the direction of flow of gas to be treated in the reactor.

A method and an apparatus for manufacturing such a corrugated structure inclusive of the multiply structure have been well established, and since in the invention, such methods and apparatus are applicable to the manufacturing of the honeycomb structure from the sheets of the invention, further detailed explanation thereon will be omitted herein.

Figure 1:
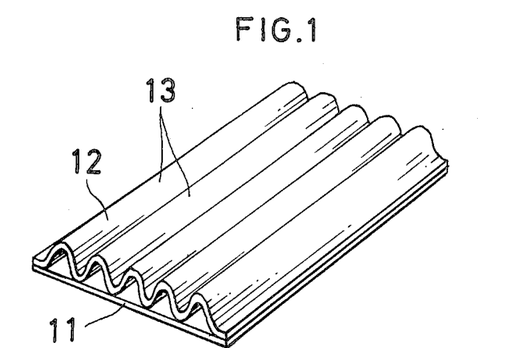
FIG. 1 is a perspective view of a flat sheet and a corrugated sheet both of the invention glued to each other for manufacturing therefrom a honeycomb structure.
Figure 2:
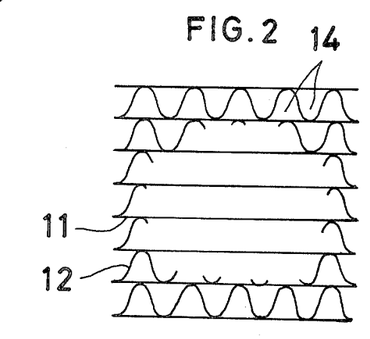
FIG. 2 is a sectional view of a preferred embodiment of a honeycomb structure manufactured from the sheets of FIG. 1.
Figure 3:
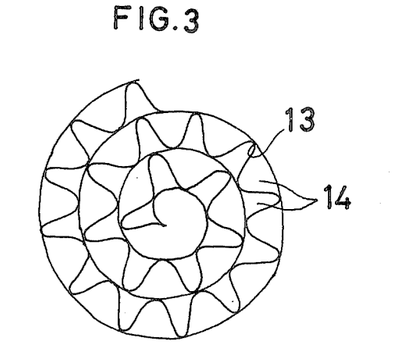
FIG. 3 is sectional view of a further embodiment of a honeycomb structure manufactured from the sheets of FIG. 1.

A further honeycomb structure is shown in FIG. 3, in which the single-faced corrugated board of FIG. 1 is rolled with the tops 13 of the corrugations glued to the back side of the linerboard. This honeycomb is also usually held in a basket so as to have passages 14 parallel to the flow of gas to be treated.

Figure 4:
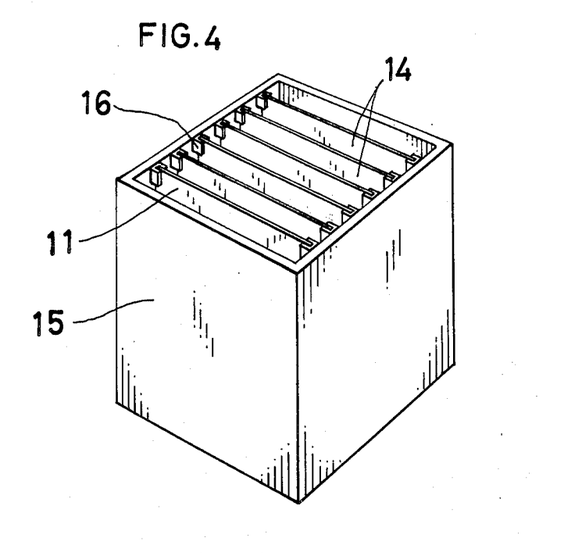
FIG. 4 is a perspective view of still another embodiment of a honeycomb structure.
Figure 5:
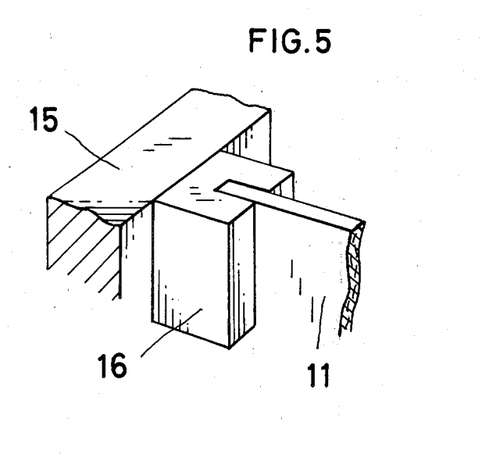
FIG. 5 is a perspective view illustrating in detail an example of a holder for fixing the sheets to form the honeycomb structure of FIG. 4.

A third honeycomb structure from the sheet of the invention is shown in FIG. 4, in which the flat sheets 11 of the invention are arranged parallel to each other in a basket 15 or a frame to form passages 14 for a gas to be treated and are fixed therein with both the ends thereof held by holders 16 attached to the basket. FIG. 5 illustrates an example of holder 16 attached to the basket 15. For example, the basket and holders are of metal, and the holder is welded to the basket.

According to the present invention, an improved adhesive is used on manufacturing a honeycomb structure from the sheet of the invention. The adhesive of the invention comprises 100 parts by weight of an aqueous colloidal solution containing about 10–30% by weight, preferably about 20–30% by weight, of silica based on the solution having about 1–50 parts by weight, preferably about 2–20 parts by weight, of at least one finely divided refractory oxide selected from the group consisting of silica, alumina, silica-alumina and titania uniformly dispersed therein. The colloidal silica solution, as is well known, contains fine silica particles of about 1–100 millimicrons in particle size and about 10–45 millimicrons in average particle size dispersed in water. A marketed example of the solution is, for example. Snowtex No. 30 (Nissan Kagaku) which contains about 30% by weight of silica, and is preferably used in the invention.

Finely divided silica, also known as white carbon, used in the invention preferably has a very large specific surface area of about 100–400 $m^2/g$, a primary particle size of about 25–150 millimicrons and an average particle size of about 40–200 millimicrons. Marketed products such as Syloid (Shiraishi Kogyo), Acrosil 2000 (Japan Aerosil) can be used. Finely divided alumina used in the invention preferably has a specific surface area of about 100–300 $m^2/g$, a little smaller than that of γ-alumina, a primary particle size of about 10–150 millimicrons and an average particle size of about 30–70 millimicrons. A marketed product, Aluminum Oxide C (Japan Aerosil), is one of the suitably used alumina in the invention. Finely divided silica-alumina used in the invention has a specific surface area of about 200 $m^2/g$, a little smaller than that of the finely divided silica, a primary particle size of about 1–80 millimicrons and an average particle size of about 10–30 millimicrons. Marketed products such as Aerosil COK 84 and Aerosil MOX 170 (both Japan Aerosil) can be used in the invention. Finely divided titania used in the invention has preferably a specific surface area of about 50 $m^2/g$, a primary particle size of about 10–120 millimicrons and an average particle size of about 15–40 millimicrons. A marketed product such as Titanium 25 (Japan Aerosil) can be used.

The adhesive preferably further contains about 0.01–15 parts by weight, more preferably, about 0.05–5 parts by weight, of an water-soluble organic polymer relative to 100 parts by weight of the colloidal silica solution so as to increase the adhesive force thereof. The polymer also serves to increase the viscosity of the adhesive, thereby permitting the control of the permeation of the adhesive into the sheet and improving the productivity in manufacturing a honeycomb structure. The water-soluble polymers used in the invention are preferably polyethylene oxide of molecular weight of about 10000-100000, carboxymethylcellulose of polymerization degree of about 300-500, methylcellulose of polymerization degree of about 70-650, and polyvinyl-alcohol of polymerization degree of about 100-200. The adhesive of the invention preferably has a viscosity of about 10-500 cp., and is usually applied in an amount of 10-400 g/m².

The adhesive according to the invention may be simply prepared by dispersing the refractory oxide powder in the colloidal silica solution. In a preferred method, the oxide powder is mixed thoroughly with and dispersed in the colloidal solution under shearing force applied thereto using an appropriate mixing device such as a three-roll mill and a micro-agitor.

The adhesive may further contain less than about 5 parts by weight, in relation to 100 parts by weight of the refractory oxides contained therein, of such refractory oxides of a larger size, and/or less than about 5 parts by weight of an inorganic fiber such as asbestos fiber, for example, of about 0.1-1 mm in length and about 0.1-10 microns in diameter.

It will be readily understood that the adhesive of the invention is applicable to any substrate which is exposed to a high temperature.

As has been described above, according to the invention, a higher catalytic activity is provided with the heat-resistant sheet such as asbesto sheet. This is a remarkable contrast with the sheet catalyst in which the catalyst forming material is carried in the sheet after the sheet forming. Furthermore, according to the invention, the catalyst forming material is coated on the sheet or the honeycomb in a thickness of about 50-100 microns, much smaller than the prior art, to provide a higher catalytic activity. This is also a remarkable contrast with the prior catalyst which has a thick coating thereon of the catalyst forming material, but a low activity.

A further advantage of the catalyst and the carrier therefor of the invention is that they are light in weight and easy to handle, but also they have a sufficient mechanical strength for further processing and practical use.

The invention will be understood more readily with reference to the following examples; however, these examples are intended to illustrate the invention and are not to be construed to limit the scope of the invention.

EXAMPLE 1

Fifty grams of asbestos fiber of about 7 microns in diameter in 2 mm in average length were sufficiently beaten in 2 l of water, and to the resultant slurry was added 50 g of anatase titania powder of 0.5 microns in average particle size, and 7 g of vanadium pentoxide of about 3 microns in average particle size, and thoroughly mixed therewith. The slurry was further mixed with ammonia water to adjust pH thereof of about 8, and was added thereto 0.7 g of Lufax 295, a cationic polyelectrolyte sold by Rohm & Haas Co., and the sulfuric acid to further adjust pH of the mixture to about 4, followed by the addition of 1 g of Nipol 1571, an acrylonitrile-butadiene copolymer binder sold by Nihon Geon, thus fixing the oxides in the fiber. The thus obtained stock slurry was hand-made into a sheet by a hand mould, and dried.

Thus thus obtained sheet of 0.3 mm in thickness and 260 g/m² was then corrugated and formed into a single-faced corrugated board, as is shown in FIG. 1, by a conventional corrugating machine using silica sol as a binder. The corrugated board was then formed into a honeycomb structure manually by use of the silica sol, thereby providing a honeycomb catalyst A having a volume of 86 ml and an equivalent honeycomb diameter of 4 mm.

EXAMPLE 2

The same asbestos fibers (250 g) as used in EXAMPLE 1 were sufficiently beaten in 15 l of water. To the resultant slurry was added 500 g of anatase titania powder, the same as used in the previous example, and 7 g of Lufax 295, followed by the addition of sulfuric acid to arrange pH of the slurry to about 5. The slurry was further mixed with 10 g of Nipol 1571, to provide a stock. The stock was then hand-made into a sheet, and dried to provide a sheet of 0.3 mm in thickness and 290 g/m². The sheet was then formed into a honeycomb carrier of the multiply corrugated board of the same size in the same manner as in EXAMPLE 1.

Another slurry for immersing therein the carrier was prepared by mixing 5 g of vanadium pentoxide with 45 g of anatase titania in 250 ml of water in a stainless breaker, and stirring the mixture for 1 hr with the aid of 50 ml of glass beads added thereto. The honeycomb carrier was then immersed in the slurry, the excess thereof removed from the honeycomb, and dried. The honeycomb as immersed again in the slurry and dried, thus providing a honeycomb catalyst B having 4.2 g of the oxides therein.

EXAMPLE 3

The same asbestos fibers (1.5 kg) as used in EXAMPLE 1 were sufficiently beaten in 30 l of water, and to the resultant slurry was added and mixed therewith 500 g of anatase titania of the same size as used in EXAMPLE 1. 21 g of Lufay 295, and then sulfuric acid to arrange pH of the mixture to about 5, and then 10 g of Nipol 1571. The thus obtained stock was hand-made into a sheet of 1 mm in thickness and 060 g/m².

The sheets obtained were fixed parallel to each other in a basket of capacity of 84 ml so as to form a honeycomb structure as is shown in FIG. 4. The honeycomb structure was then immersed in the same slurry as used in EXAMPLE 2 and dried in the same manner as in EXAMPLE 2, thus providing a honeycomb catalyst C having 4.8 of the oxides carried therein.

EXAMPLE 4

Thirty grams of alumina powder of about 0.1 microns in average particle size (Caeser). 67 g of asbestos fiber, the same as used in EXAMPLE 1, 3.5 g of Nipol 1571 and 1.5 g of alumina sol were thoroughly mixed in 2.5 l of water while beating sufficiently the fiber. The thus obtained stock was then hand-made into a sheet of 0.3 mm in thickness and 270 g/m².

In this example an improved adhesive was used to manufacture a honeycomb structure from the above sheet. The adhesive used was prepared by adding 5 g of Aerosil 2000, finely divided silica sold by Japan Aerosil, to 100 g of Snowtex No. 30, an aqueous colloidal silica solution containing about 30 % by weight of silica sold by Nissan Kagaku, and mixed thoroughly by the use of a micro-agitor for 10 min.

Using this adhesive, the sheets obtained above were formed into a honeycomb structure of the same size in the same manner as in EXAMPLE 1, and dried at a temperature of about 200° C. for 3 hrs. The honeycomb was then immersed in 100 ml of an aqueous solution of vanadium oxalate prepared by mixing 10 g of ammonium metavanadate and 35 g of oxalic acid in water, and dried, thus providing a honeycomb catalyst D having 6.3 g of vanadium pentoxide as an active agent carried therein.

EXAMPLE 5

Ten grams of tungsten trioxide, 40 g of I-alumina, 4 g of glass fiber of 0.3 mm in average length and of about 6 microns in diameter, and 200 ml of water were thoroughly mixed in a stainless beaker for 20 min. together with 50 ml of glass beads. In the thus prepared slurry was immersed the same honeycomb carrier as obtained in EXAMPLE 2 the excess amount of the slurry removed from the honeycomb, dried at a temperature of 40° C. for 3 hrs. while forcing air to pass through the honeycomb at a linear velocity of about 3 m/sec, thus providing a honeycomb catalyst E having 8.5 g of the oxides carried therein.

EXAMPLE 6

Five grams of vanadium pentoxide, 40 g of anatase titania, 4 g of ceramic fiber of 2 mm in average length and of 5 microns in diameter, and 200 ml of water were mixed in a stainless beaker for 20 min. with the aid of 50 ml of glass beads.

In the thus prepared slurry was immersed the same honeycomb carrier as in EXAMPLE 2, and a honeycomb catalyst F was obtained which carried 5.1 g of the oxides therein.

REFERENCE EXAMPLE 1

A marketed asbestos sheet of 0.3 mm in thickness and 150 g/m$^2$ in basis weight (Japan asbestos) was formed into a honeycomb structure of the same size in the same manner as in EXAMPLE 1. The honeycomb was then immersed in the same slurry containing titania and vanadium pentoxide as used in EXAMPLE 2, the excess amount of the slurry removed from the honeycomb, and dried. After the repetition of the immersion four times, a honeycomb catalyst R was obtained which had 4.1 g of the catalyst forming material.

REFERENCE EXAMPLE 2

Fifty grams of asbestos fiber, the same as used in EXAMPLE 1, were sufficiently beaten in 1.5 l of water. The resultant stock was hand-made into a sheet of 0.3 mm in thickness and 169 g/m$^2$ in basis weight. The sheet was then formed into a honeycomb carrier of the same size and in the same manner as in EXAMPLE 2.

This carrier was immersed in 100 ml of an aqueous solution of vanadium oxalate which was prepared by mixing 10 g of ammonium metavanadate and 35 g of oxalic acid in water, dried and calcined to provide a honeycomb catalyst S having 5.8 g of vanadium pentoxide carried therein.

REFERENCE EXAMPLE 3

Except the use of water glass as an adhesive, the honeycomb catalyst T was prepared which carried 6.3 g of vanadium pentoxide in the same manner as in EXAMPLE 4.

EXAMPLE 7

The catalytic activity of the catalysts obtained above in terms of the conversion of nitrogen monoxide into nitrogen and water in the presence of ammonia as a reducing agent was estimated. Each of the catalysts for the estimation was charged in a Pyrex tube of 50 mm in inner diameter with a heat insulator wrapped therearound to maintain the temperature therein constant. A gas mixture consisting of 200 ppm of nitrogen monoxide, 200 ppm of ammonia, 10% by volume of water vapor, 12% by volume of carbon dioxide. 1000 ppm of sulfur dioxide, and the residue nitrogen was passed through the catalyst at a temperature of 350° C. at a space velocity of 10000 hr.$^{-1}$ (converted value at room temperature). The conversion of nitrogen monoxide (NO-conversion) was calculated from the following equation: [(NO concentration at the inlet)—(NO concentration at the outlet)] (NO concentration at the inlet)×100 (%). The results are shown in TABLE 1.

TABLE 1

| Temperatures | NO-Conversion (%) | | | | | | | |
|---|---|---|---|---|---|---|---|---|
| (°C.) | A | B | C | D | F | R | S | T |
| 250 |  | 83.2 | 65.7 |  | 86.7 | 44.0 |  |  |
| 300 |  | 94.4 | 72.8 |  | 95.2 | 61.3 |  |  |
| 350 | 98.9 | 98.0 | 79.1 | 92.3 | 98.9 | 65.4 | 45.1 | 57.8 |

EXAMPLE 8

When the catalysts B, C, E, F and R were prepared, the coated surfaces were observed with a 30-magnification glass. Some cracks were observed on B and C, and many were on R. However, there was no cracks on the coated surfaces of the catalyst E and F.

The coated surfaces of the above catalysts were separated by pencils of hardness 2H and 11B, respectively, under the load of 100 g, to observe whether scratches appeared. The results are shown in TABLE 2.

TABLE 2

|  | 2H | HB |
|---|---|---|
| B | appeared | not appeared |
| C | appeared | not appeared |
| E | not appeared | not appeared |
| F | not appeared | not appeared |
| R | appeared | appeared |

EXAMPLE 9

Fifty grams of silica-alumina fiber of 5 mm in average length and of about 0.3 microns in diameter were sufficiently beaten in 2 l of water, and were added thereto and mixed therewith 50 g of γ-alumina powder and 50 g of silica sol containing about 20% by weight of silica. The thus obtained stock was formed into a sheet of 1 mm thick by a hand mould, dried at room temperature under a reduced pressure, and pressed by rolls to provide a sheet of 0.5 mm in thickness and 310 g/m$^2$. The sheets were then formed into a honeycomb structure of the same size in the same manner as in EXAMPLE 1.

The honeycomb carrier was then immersed in an aqueous solution of chloplatinic acid, dried, calcined, and reduced in a hydrogen atmosphere to provide a catalyst having 0.1% by weight of platinum based on the honeycomb catalyst.

The catalyst was charged in a Pyrex glass tube of 50 mm in inner diameter with a heat insulator wrapped therearound. A gas mixture consisting of 2% by weight of carbon monoxide, 0.2% by volume of propane, 5% by volume of oxygen and the residue nitrogen was passed through the catalyst at a temperature of 250° C. at a space velocity of 20000 hr.$^{-1}$ (converted value at room temperature), and the conversions of carbon monoxide and propane into carbon dioxide and water were 87.6% and 60.1%, respectively.

EXAMPLE 10

This example is to illustrate the adhesive of the invention. To 100 parts by weight of an aqueous colloidal solution, Snowtex No. 30, containing about 30% by weight of silica therein, was added and thoroughly mixed therewith a finely divided refractory oxide, and optionally polyethyleneoxide, PEO 8 (Seitetsu Kagaku Kogyo) for 10 min. by a micro-agitor. The amounts of the refractory oxide and PEO 8 added, and the resultant adhesives are shown in TABLE 3.

Figure 6:
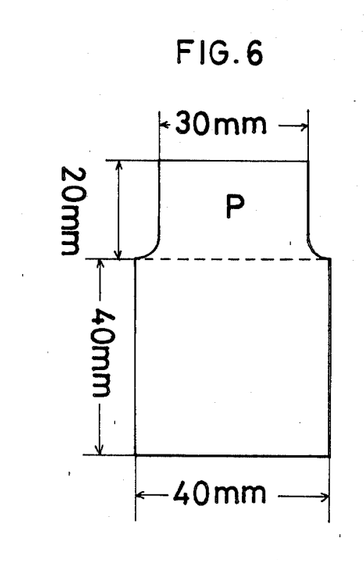
FIG. 6 is a plan view showing a shape of a sheet used for estimating the adhesive strength of an adhesive of the invention.

A marketed asbestos sheet of 0.5 mm in thickness and 150 g/m$^2$ in basis weight was cut into a shape having a portion P of a reduced area, as is shown in FIG. 6. The portion P is coated with 0.5 mg of each adhesive and bonded to a second sheet at the portion P, and dried at a temperature of about 120° C. for 1 hr. The adhesive strength was estimated by peeling the sheets from each other by the use of a Schopper's apparatus.

For the purpose of comparison, the adhesive strengths were estimated in the same manner as in above on the adhesive (p) having an insufficient amount of the refractory oxide; (q) consisting of Snowtex No. 30 only; (r) consisting of Alumina Sol No. 20 containing about 20% by weight of alumina (Nissan Kagaku); and (s) consisting of 100 parts by weight of Alumina Sol No. 20 and 5 parts by weight of Alumina Oxide C.

The results are shown on the adhesives from (a) to (o) of the invention together with the reference adhesives in TABLE 3.

TABLE 3

|   | Refractory oxides* | PEO 8 | Adhesive strengths (g) |
|---|---|---|---|
| a | 5 parts silica | | 58 |
| b | 5 parts alumina | | 19 |
| c | 5 parts silica-alumina | | 64 |
| d | 5 parts titania | | 45 |
| e | 5 parts silica | 0.5 parts | 82 |
| f | 5 parts alumina | 0.5 parts | 23 |
| g | 5 parts silica-alumina | 0.5 parts | 105 |
| h | 5 parts titania | 0.5 parts | 62 |
| i | 1 part silica-alumina | | 21 |
| j | 10 parts silica-alumina | | 68 |
| k | 50 parts silica-alumina | | 40 |
| l | 5 parts titania | 0.01 parts | 66 |
| m | 5 parts titania | 0.1 parts | 79 |
| n | 5 parts titania | 5 parts | ** |
| o | 5 parts titania | 10 parts | ** |
| p | 0.5 parts silica-alumina | | 9 |
| q | | | 7 |
| r | | | <1 |
| s | | | 1 |

*Aerosil 2000, Aluminum Oxide C, Aerosil COK 84 and Titanium Oxide P25 were used as finely divided refractory oxides, silica, alumina, silica-alumina and titania, respectively.
**The adhesive strength was too large to cause the tearing of the sheets.

What is claimed is:

1. A method for producing a catalytic material, which consists essentially of admixing (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and (b) at least one powdery water-insoluble carrier material selected from the group consisting of titanium oxide and aluminum oxide or a powdery water-insoluble precursor of the carrier material which will be converted into the oxide when calcined, thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then immersing the sheet or a honeycomb structure manufactured therefrom in an impregnating slurry or solution containing catalytically active agents or their precursors which will be converted into the active agent when calcined, and optionally carrier materials or their precursors which will be converted into the oxide when calcined, and drying the sheet or honeycomb structure.

2. The method as claimed in claim 1, wherein the carrier material has a particle size of about 0.01–50 microns.

3. The method as claimed in claim 1, wherein the honeycomb structure is manufactured from the sheet with an adhesive which comprises 100 parts by weight of an aqueous colloidal silica solution containing about 10–30% by weight of silica of about 1–100 millimicrons in particle size and about 10–45 millimicrons in average particle size, and 1–50 parts by weight of at least one of finely divided refractory oxide particles selected from the group consisting of silica having specific surface area of 100–400 m$^2$/g, primary particle size of 25–150 millimicrons and average particle size of 40–200 millimicrons, alumina having specific surface area of 100–300 m$^2$/g, primary particle size of 10–150 millimicrons and average particle size of 30–70 millimicrons, silica-alumina having specific surface area of about 200 m$^2$/g, primary particle size of 1–80 millimicrons and average particle size of 10–30 millimicrons, and titania having specific surface area of about 50 m$^2$/g, primary particle size of 10–120 millimicrons and average particle size of 15–40 millimicrons, uniformly dispersed in the colloidal solution.

4. The method as claimed in claim 3, wherein the adhesive further contains 0.01–15 parts by weight of an organic polymer selected from the group consisting of polyethylene oxide, carboxymethylcellulose, methylcellulose and polyvinylalcohol.

5. The method as claimed in claim 1, wherein the impregnating slurry or solution further contains 1–10 parts by weight of at least one inorganic heat-resistant fiber of about 0.1–30 microns in diameter and about 0.5–5 mm in fiber length selected from the group consisting of asbestos fiber, ceramic fiber, silica fiber, silica-alumina fiber, chrysotile fiber, rock wool, glass fiber, potassium titanate fiber, anthophyllite fiber and carbon fiber, or about 0.5–5 parts by weight of polytetrafluoroethylene fiber, in relation to 100 parts by weight of the total weight of catalytically active agents, carrier materials and their precursors.

6. A method for producing a catalytic material for the reduction of nitrogen oxides in the presence of ammonia, which consists essentially of admixing (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and (b) at least one powdery water-insoluble carrier material selected from the group consisting of titanium oxide and aluminum oxide or a powdery water-insoluble precursor of the carrier material which will be converted into the oxide when calcined.

thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then immersing the sheet or a honeycomb structure manufactured therefrom in an impregnating slurry or solution containing at least one catalytically active agent of an oxide selected from the group consisting of Cu, Fe, V, W and Mo or their precursors which will be converted into the oxide when calcined, and optionally carrier materials or their precursors which will be converted into the carrier materials when calcined, and drying the sheet or honeycomb structure.

7. The method as claimed in claim 6, wherein the carrier material has a particle size of 0.01–50 microns.

8. The method as claimed in claim 6, wherein the honeycomb structure is manufactured from the sheet with an adhesive which comprises 100 parts by weight of an aqueous colloidal silica solution containing about 10–30 % by weight of silica of about 1–100 millimicrons in particle size and about 10–45 millimicrons in average particle size, and 1–50 parts by weight of at least one of finely divided refractory oxide particles selected from the group consisting of silica having specific surface area of 100–400 $m^2/g$, primary particle size of 25–150 millimicrons and average particle size of 40–200 millimicrons, alumina having specific surface area of 100–300 $m^2/g$, primary particle size of 10–150 millimicrons and average particle size of 30–70 millimicrons, silica-alumina having specific surface area of about 200 $m^2/g$, primary particle size of 1–80 millimicrons and average particle size of 10–30 millimicrons, and titania having specific surface area of about 50 $m^2/g$, primary particle size of 10–120 millimicrons and average particle size of 15–40 millimicrons, uniformly dispersed in the colloidal solution.

9. The method as claimed in claim 8, wherein the adhesive further contains 0.01–15 parts by weight of an organic polymer selected from the group consisting of polyethylene oxide, carboxymethylcellulose, methylcellulose and polyvinylalcohol.

10. The method as claimed in claim 6, wherein the impregnating slurry or solution further contains 1–10 parts by weight of at least one inorganic heat-resistant fiber of about 0.1–30 microns in diameter and about 0.5–5 mm in fiber length selected from the group consisting of asbestos fiber, ceramic fiber, silica fiber, silica-alumina fiber, chrysotile fiber, rock wool, glass fiber, potassium titanate fiber, anthophyllite fiber and carbon fiber, or about 0.5–5 parts by weight of polytetrafluoroethylene fiber, in relation to 100 parts by weight of the total weight of catalytically active agents, carrier materials and their precursors.

11. A method for producing a catalyst for the oxidation of carbon monoxide and hydrocarbons to carbon dioxide and water, which consists essentially of admixing (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and (b) at least one powdery water-insoluble carrier material selected from the group consisting of titanium oxide and aluminum oxide or a powdery water-insoluble precursor of the carrier material which will be converted into the oxide when calcined, thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then immersing the sheet or a honeycomb structure manufactured therefrom in an impregnating slurry or solution which contains a compound of platinum, drying and calcining the sheet or honeycomb, and reducing the platinum compound to platinum.

12. The method as claimed in claim 11, wherein the carrier material has a particle size of about 0.01–50 microns.

13. The method as claimed in claim 11, wherein the sheet or honeycomb is immersed in an aqueous solution which contains chloroplatinic acid, which is then dried, calcined, and then the chloroplatinic acid is reduced in a hydrogen atmosphere.

14. The method as claimed in claim 11, wherein the honeycomb structure is manufactured from a sheet with an adhesive which comprises 100 parts by weight of an aqueous colloidal silica solution containing about 10–30% by weight of silica of about 1–100 millimicrons in particle size and about 10–45 millimicrons in average particle size, and 1–50 parts by weight of at least one finely divided refractory oxide particles selected from the group consisting of silica having specific surface area of 100–400 $m^2/g$, primary particle size of 25–150 millimicrons and average particle size of 40–200 millimicrons, alumina having specific surface area of 100–300 $m^2/g$, primary particle size of 10–150 millimicrons and average particle size of 30–70 millimicrons, silica-alumina having specific surface area of about 200 $m^2/g$, primary particle size of 1–80 millimicrons and average particle size of 10–30 millimicrons, and titania having specific surface area of about 50 $m^2/g$, primary particle size of 10–120 millimicrons and average particle size of 15–40 millimicrons, uniformly dispersed in the colloidal solution.

15. The method as claimed in claim 11, wherein the adhesive further contains 0.01–15 parts by weight of an organic polymer selected from the group consisting of polyethylene oxide, carboxymethylcellulose, methylcellulose and polyvinylalcohol.

16. The method as claimed in claim 11, wherein the impregnating slurry or solution further contains 1–10 parts by weight of at least one inorganic heat-resistant fiber of about 0.1–30 microns in diameter and about 0.5–5 mm in fiber length selected from the group consisting of asbestos fiber, ceramic fiber, silica fiber, silica-alumina fiber, chrysotile fiber, rock wool, glass fiber, potassium titanate fiber, anthophyllite fiber and carbon fiber, or about 0.5–5 parts by weight of polytetrafluoroethylene fiber, in relation to 100 parts by weight of the total weight of catalytically active agents, carrier materials and their precursors.

17. A method for producing a catalytic material, which consists essentially of admixing
   (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and
   (b) at least one powdery water-insoluble carrier material selected from the group consisting of titanium oxide and aluminum oxide or a powdery water-insoluble precursor of the carrier material which will be converted into the oxide when calcined,
   thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then
   immersing the sheet or a honeycomb structure manufactured therefrom in an impregnating slurry or solution containing carrier materials and catalytically active agents or their precursors which will be converted into their oxides when calcined and drying the sheet or honeycomb structure.

18. A method for producing a catalytic material for the reduction of nitrogen oxides in the presence of ammonia, which consists essentially of admixing
   (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and
   (b) at least one powdery water-insoluble carrier material selected from the group consisting of titanium oxide and aluminum oxide or a powdery water-insoluble precursor of the carrier material which will be converted into the oxide when calcined,
   thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then
   immersing the sheet or a honeycomb structure manufactured therefrom in an impregnating slurry or solution containing carrier materials and a catalytically active agent selected from the group consisting of Cu, Fe, V, W and Mo or their precursors which will be converted into their oxides when calcined and drying the sheet or honeycomb structure.

19. A method for producing a catalyst for the oxidation of carbon monoxide and hydrocarbons to carbon dioxide and water, which consists essentially of admixing
   (a) a slurry prepared by beating at least one of inorganic fibers of about 1–20 mm in fiber length and of about 0.1–30 microns in diameter selected from the group consisting of asbestos fiber, silica fiber, silica-alumina fiber, chrysotile fiber, rock wool, glass fiber, anthophyllite fiber, potassium titanate fiber, carbon fiber and ceramic fiber, in water, and
   (b) at least one powdery water-insoluble carrier material selected from the group consisting of titanium oxide and aluminum oxide or a powdery water-insoluble precursor of the carrier material which will be converted into the oxide when calcined,
   thereby forming a stock material containing the solid components of fiber and carrier material in an amount of 1–10% by weight with about 80–40 parts by weight of fiber in relation to 20–60 parts by weight of carrier material, forming the stock material into a sheet by paper-making means and drying the sheet, and then
   immersing the sheet or a honeycomb structure manufactured therefrom in an impregnating slurry or solution containing carrier materials or their precursors which will be converted into their oxides when calcined and a compound of platinum, and drying and calcining the sheet or honeycomb, and reducing the platinum compound to platinum.

* * * * *